United States Patent
Hofmann et al.

(10) Patent No.: US 6,460,688 B1
(45) Date of Patent: Oct. 8, 2002

(54) FIXING DEVICE FOR A PART THAT CAN BE INSERTED BETWEEN TWO ADJACENT SUPPORTS

(75) Inventors: Werner Hofmann, Bad Mergentheim; Thomas Wilhelm, Creglingen, both of (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 0 days.

(21) Appl. No.: 09/889,259

(22) PCT Filed: Mar. 17, 2000

(86) PCT No.: PCT/DE00/00844

§ 371 (c)(1),
(2), (4) Date: Jul. 13, 2001

(87) PCT Pub. No.: WO00/71443

PCT Pub. Date: Nov. 30, 2000

(30) Foreign Application Priority Data

May 21, 1999 (DE) .......................................... 199 23 347

(51) Int. Cl.[7] .............................................. B65G 35/00
(52) U.S. Cl. ..................... 198/722; 198/782; 198/788; 403/167; 403/408.1; 411/32
(58) Field of Search ................................. 198/722, 782, 198/788; 193/35 SS; 403/167, 168, 408.1; 411/32, 33

(56) References Cited

U.S. PATENT DOCUMENTS

| | | | |
|---|---|---|---|
| 1,735,418 A | * 11/1929 | Bolger | ...................... 403/167 |
| 3,698,539 A | 10/1972 | Schwarzbeck | |
| 3,899,070 A | * 8/1975 | Lang | ........................... 198/782 |
| 5,042,645 A | 8/1991 | Pritchard | |
| 5,361,884 A | 11/1994 | Yonezawa | |
| 5,568,858 A | * 10/1996 | Thompson | .................. 198/782 |
| 5,803,234 A | * 9/1998 | Podkanski et al. | .......... 198/782 |

FOREIGN PATENT DOCUMENTS

| | | |
|---|---|---|
| DE | 86 29 521 | 2/1987 |
| DE | 298 09 205 | 10/1998 |
| DE | 198 07 231 | 9/1999 |
| EP | 0 122 573 | 10/1984 |
| FR | 1 488 034 | 10/1967 |
| FR | 2 382 385 | 9/1978 |

* cited by examiner

Primary Examiner—Joseph E. Valenza
(74) Attorney, Agent, or Firm—Collard & Roe, P.C.

(57) ABSTRACT

The aim of the invention is to provide a simple, safe to handle fixing device for a par that can be inserted between adjacent supports, especially centrally. Locating holes that are aligned approximately flush with each other, for holding elements of the part are provided in the adjacent supports. The holding elements are configured in the form of pegs mounted in the part. The pegs are provided with a screw thread at their second ends and each engage in a corresponding screw of sliding pieces that can slide in the part. The sliding pieces can be slid and stopped in a plane defined by the longitudinal axes of the pegs. The part has at least one pair of pegs on opposite outer surfaces that are flush with each other through the part.

12 Claims, 2 Drawing Sheets

FIXING DEVICE FOR A PART THAT CAN BE INSERTED BETWEEN TWO ADJACENT SUPPORTS

CROSS REFERENCE TO RELATED APPLICATIONS

Figure 1:
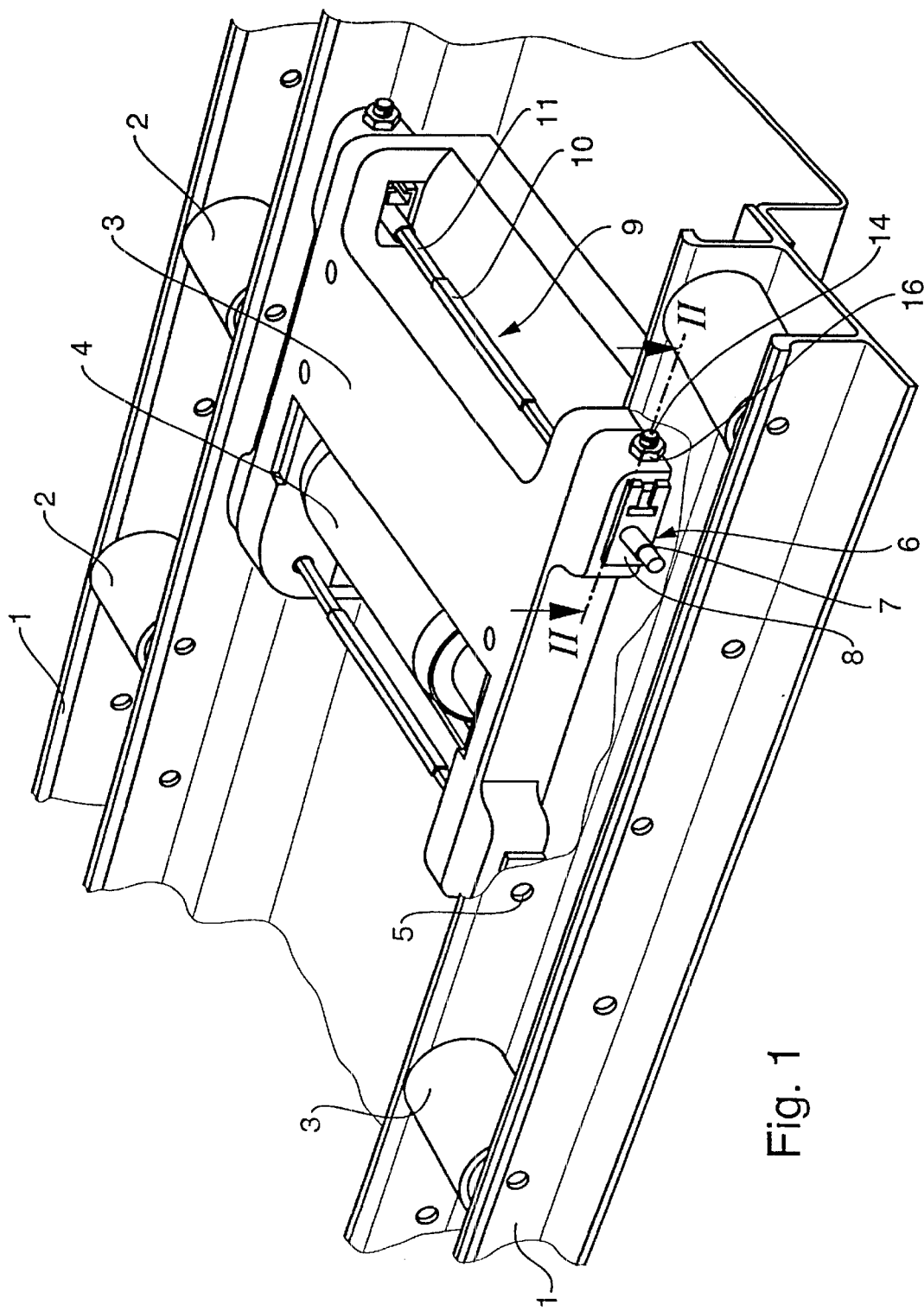

Applicants claim priority under 35 U.S.C. §119 of GERMAN Application No. 199 23 347.0, filed on May 21, 1999. Applicants also claim priority under 35 U.S.C. §120 of PCT/DE00/00844, filed on Mar. 17, 2000. The international application under PCT article 21(2) was not published in English.

This invention relates to a fixing device for a part that can be inserted between adjacent supports, especially at the center.

The fixing device should be easy to handle and in particular should guarantee a central alignment of the part to be inserted between the supports.

Such an object is achieved by a generic fixing device having the characterizing feature of Patent claim 1.

Expedient and advantageous embodiments are the object of the subordinate claims.

Figure 2:
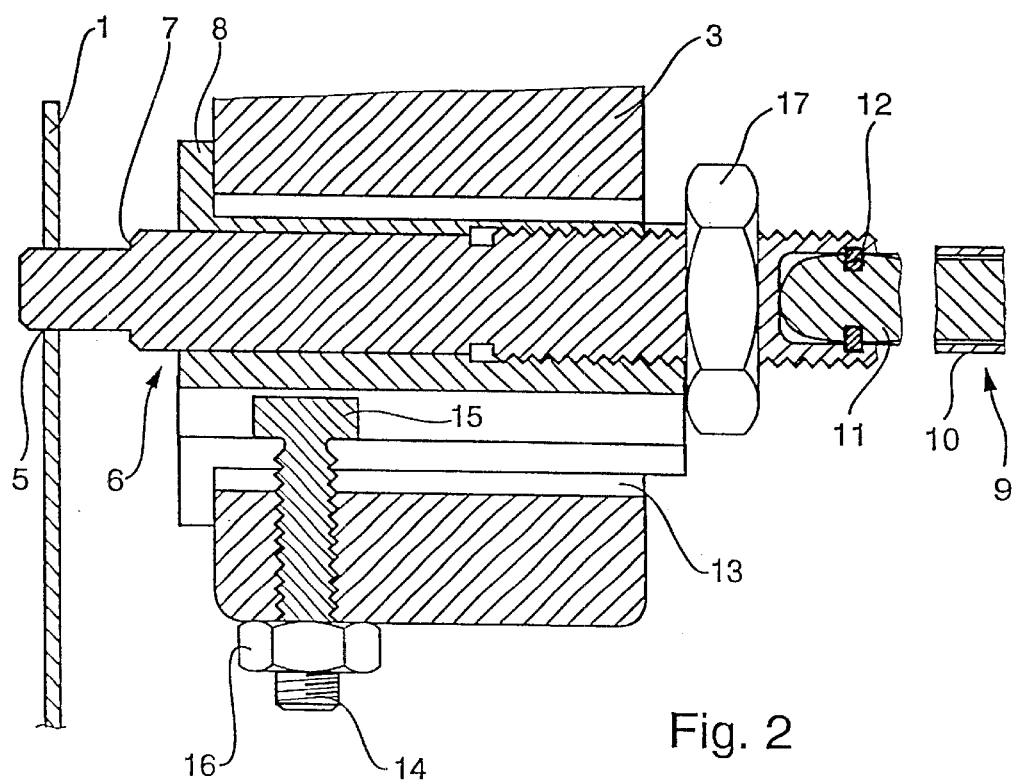

One embodiment is illustrated in the drawings, which show:

FIG. 1: a perspective view of a fixing device on a part inserted between two supports, FIG. 2: a section through a head of the fixing device mounted in the part to be fixed according to line IV—IV in FIG. 1 as a detail.

A conveyance system with a conveyance plane consists of adjacent supports 1 which are installed in a stationary position, with conveyor rollers 2 mounted in the supports so they can rotate freely and conveyor rollers 4 mounted so they can be driven in a part 3 designed as a drive housing between supports 1. Conveyor rollers 2 and 4 form a common conveyance plane, with the position of conveyor rollers 4 being adjustable in the direction perpendicular to the conveyance plane.

Boreholes to accommodate part 3 are provided in the support 1. The boreholes 5 should be in alignment with one another with respect to the structural space in which part 3 is to be secured.

In the case of part 3 attached to supports 1, the journals 6 of the part 3 engage in the boreholes 5 of the supports 1.

To allow installation and removal of part 3 between the supports 1 and 2, the journals 6 must be displaceable in the opposing boreholes 5 so that they are aligned in the axis. In addition, journals 6 must have a stop 7 adjacent to an end area with which they should engage in the boreholes 5 in the supports 1; this stop may be designed as a ring collar, for example.

The journals 6 are provided with an outside thread in the respective areas that cannot engage in the boreholes 5 of the supports 1. With this outside thread, the journals 6 engage in a sliding part 8 mounted in part 3, where these sliding parts 8 are each provided with a matching thread. Aligned opposing journals 6 are each provided with opposite threads of the same pitch.

With the help of an entraining device 9 which grips two aligned opposing journals in a frictionally locked manner, journals 6 can be rotated uniformly in contra-rotation and thus moved into or out of the part.

An entraining device 9 may consist, for example, of a bushing provided centrally between two journals 6 that are to be connected and two sectional rods 11 engaging in the ends of the bushings, so that with their ends which face away from the bushing 10, the sectional rods engage in hollow spaces in journals 6 in a frictionally locked manner in the peripheral direction, e.g., by positive locking by means of polygonal sections. The frictional locking can be achieved by the complementary designs of polygonal sections of bushing 10 and sectional rods 11 which engage in the bushing and in the hollow spaces in the journals 6. To prevent the sectional rods 11 from slipping out of journals 6, the sectional rods 11 may be secured in their hollow spaces by means of locking rings 12 which are snapped into opposing grooves inside of the journals 6 and the sectional rods 11.

Since the opposing boreholes 5 of the supports 1 may be out of alignment, e.g., due to a slight mutual offset of the supports 1 in their longitudinal direction, it is possible to adjust the position of journals 6 within part 3 to such inaccuracies. Therefore, the journals 6 are mounted in sliding parts 8. These sliding parts 8 have the function of a sliding block with a guide in a sliding opening 13 which functions as a connecting link within part 3. This sliding opening 13 is designed so that the sliding part 8 can be displaced in parallel to the plane of conveyance in the longitudinal direction of the supports 1. The displacement of the sliding parts 8 is produced by an adjusting screw 14 supported on a thread in part 3. On its end facing the sliding part 8, the adjusting screw 14 has a ring collar 15 with which it engages in a dovetailed groove in sliding part 8. The adjusting screw 14 can be locked in a certain position by means of a locknut 16 that can be tightened against part 3. The journals 7 can also be locked in the set position by locknuts 17 acting on them, tightening the locknuts 17 against the sliding part 8.

Part 3 can be secured easily in a central position between the supports 1 due to the entraining device 9 and the opposing thread of journals 7. The journals 6 are inserted into boreholes 5 of the supports 1 by entraining device 9 and are braced with respect to these supports 1 over stops 7. As a rule, a part is secured in the interspace between two adjacent supports 1 by means of two journals 7 arranged in pairs.

The entraining device may have any desired design, but it is important only for the opposing journals 7 belonging to one pair of journals to be adjusted uniformly. The entraining device may also be designed so that the sectional rods 11 engaging in the journals 6 are engaged in a force locked manner so they are longitudinally displaceable.

A tilting position must be possible on the interacting polygonal faces of the hollow space of the respective journal 7 and the respective sectional rod 11 so that journals 7 that are out of alignment cannot be operated by an entraining device with sectional rods 11 engaging in the journals. to this end, the end area of the sectional rods 11 engaging in the hollow space in the journals 7 may be designed like a spherical head. In principle, a type of cardan joint must be provided between the journals 7 and the parts of the entraining device that work together with the journals.

To assemble the parts of the fixing device provided on part 3, the sliding parts 8 may be pushed into the respective openings in the part, i.e., into the sliding openings 13, and then aligned by the adjusting screws 14 and secured.

What is claimed is:

1. A fixing device for a part that can be inserted between adjacent supports, especially at the center, characterized by the features receptacle boreholes (5) in approximate alignment with one another for retaining means of the part (3) are provided in the adjacent supports, the retaining means are designed as journals (6) mounted in the part and having a shape complementary to the receptacle borehole (5) on its first end facing one support (1), and they are provided with a stop (7) for only axially limited engagement in the respective receptacle borehole on their second end, the journals (6) are provided with a thread with which they engage in a mating thread on sliding parts (8) which are displaceable in the part (3), the sliding parts (8) are displaceable and lockable in a plane spanned by the longitudinal axes of the journals (6), the part (3) has at least one pair of journals (6) aligned with one another through the part (3), the thread on the two journals (6) of a pair of journals is designed to be opposing but with the same pitch, the two journals (6) of a pair of journals can be turned toward one another by means of an entraining device (9) without slippage.

2. A fixing device according to claim 1, characterized in that the entraining device (9) is designed as a hollow sectional rod which functions as a bushing (10) and acts on the journals (6) directly or indirectly in a friction-locked manner.

3. A fixing device according to claim 1, characterized in that in a direct engagement of the bushing (10) with the journals (6), a sectional rod (11) thereof engages in the open ends of the bushing in a friction-locked. manner.

4. A fixing device according to claim 1, characterized in that the friction-locked connection is accomplished over complementary engaging profiled edge faces.

5. A fixing device according to claim 1, characterized in that the friction-locked connection between the journals (6) permits compensation of the alignment.

6. A fixing device according to claim 1, characterized in that to achieve a compensation of alignment between journals (6) of a pair of journals in the friction-locked connection area between sectional rods (11) and journals (7), the end area of the sectional rods (11) engaging in the journals (7) is designed as a spherical polygon.

7. A fixing device according to claim 1, characterized in that adjusting screws (14) inserted into threaded boreholes of the part (3) engage in a friction-locking manner on the sliding parts (B) to permit displacement thereof.

8. A fixing device according to claim 1, characterized in that locknuts (16) or (17) are provided on the threads of the adjusting screws (14) and/or on the thread of at least one journal (6) for secure locking of these parts.

9. A fixing device according to claim 1, characterized in that the friction-locked connection between an adjusting screw (14) and the respective sliding part (8) is implemented by a dovetailed tongue-and-groove joint, where the tongue is designed to be disk-shaped for turning it inside the groove.

10. A fixing device according to claim 1, characterized in that the groove of the tongue-and-groove joint is designed in the sliding part (8) and runs parallel to the axis of alignment of the journals (6) of a pair of journals.

11. A fixing device according to claim 1, characterized in that the sectional rods (11) that work together with the journals (6) of a pair of journals telescope into one another for engagement.

12. A fixing device according to claim 1, characterized in that the sectional rods, (11) engaging in the journals (6) are secured to prevent them from slipping out by means of locking rings (12) in the respective receptacle hollow space in a journal (6).

* * * * *